United States Patent
Asai et al.

(10) Patent No.: US 8,487,213 B2
(45) Date of Patent: Jul. 16, 2013

(54) ARC WELDING ROBOT CONTROL SYSTEM AND METHOD THEREOF

(75) Inventors: Akihiko Asai, Fujisawa (JP); Masayuki Shigeyoshi, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 1325 days.

(21) Appl. No.: 12/240,034

(22) Filed: Sep. 29, 2008

(65) Prior Publication Data

US 2009/0107969 A1  Apr. 30, 2009

(30) Foreign Application Priority Data

Oct. 31, 2007  (JP) .................. 2007-283287

(51) Int. Cl.
  *B23K 9/12* (2006.01)
(52) U.S. Cl.
  USPC ...................................... 219/124.1
(58) Field of Classification Search
  USPC ............. 219/124.1, 125.1, 125.11, 125.12, 219/130.5, 124.34, 124.22
  See application file for complete search history.

(56) References Cited

U.S. PATENT DOCUMENTS

| | | | |
|---|---|---|---|
| 3,742,184 A | | 6/1973 | Arikawa et al. |
| 4,390,954 A | * | 6/1983 | Manning ...................... 700/212 |
| 4,504,728 A | * | 3/1985 | Ukai et al. .................. 219/125.1 |
| 4,821,202 A | * | 4/1989 | Davis et al. .................... 700/212 |
| 4,920,248 A | * | 4/1990 | Toyoda et al. ............ 219/124.34 |
| 6,107,601 A | * | 8/2000 | Shimogama ............. 219/130.01 |
| 6,177,650 B1 | | 1/2001 | Watanabe et al. |
| 6,822,412 B1 | * | 11/2004 | Gan et al. ................. 318/568.19 |
| 2006/0273076 A1 | * | 12/2006 | Houston et al. .......... 219/130.51 |

FOREIGN PATENT DOCUMENTS

| | | |
|---|---|---|
| EP | 0 824 985 A2 | 2/1998 |
| JP | 61-138470 | 8/1986 |

* cited by examiner

*Primary Examiner* — Henry Yuen
*Assistant Examiner* — John Wasaff
(74) *Attorney, Agent, or Firm* — Oblon, Spivak, McClelland, Maier & Neustadt, L.L.P.

(57) ABSTRACT

An arc welding robot control system of the present invention includes memory devices, controlling devices, a welding condition changing position calculating device, a weaving operation controlling device that outputs a signal of completion of one weaving cycle every time when a welding torch completes to perform one weaving cycle of a predetermined movement pattern, a welding condition calculating device for calculating to-be-changed welding conditions, and a welding condition changing device that changes welding conditions of an arc welding robot, based on to-be-changed welding conditions, every time when a signal of completion of one weaving cycle is input. With this configuration, it enables a continuous change of welding conditions and a copying arc welding with high accuracy even in the case in which the arc welding robot performs a weaving operation.

4 Claims, 8 Drawing Sheets

FIG. 3

LINEAR TRAVEL P1
START OF SECTION FOR CONTINUOUSLY CHANGING WELDING CONDITIONS
WELDING CURRENT 220A, WELDING VOLTAGE 100%, WELDING SPEED 30 cm/min
WEAVING AMPLITUDE 5 mm CYCLE 120 times/min PAUSE AT BOTH ENDS 0.0 sec
ARC ON
LINEAR TRAVEL P2
FINISH OF SECTION FOR CONTINUOUSLY CHANGING WELDING CONDITIONS
WELDING CURRENT 280A, WELDING VOLTAGE 100%, WELDING SPEED 60 cm/min
WEAVING AMPLITUDE 5 mm CYCLE 180 times/min PAUSE AT BOTH ENDS 0.0 sec
ARC OFF

FIG. 4

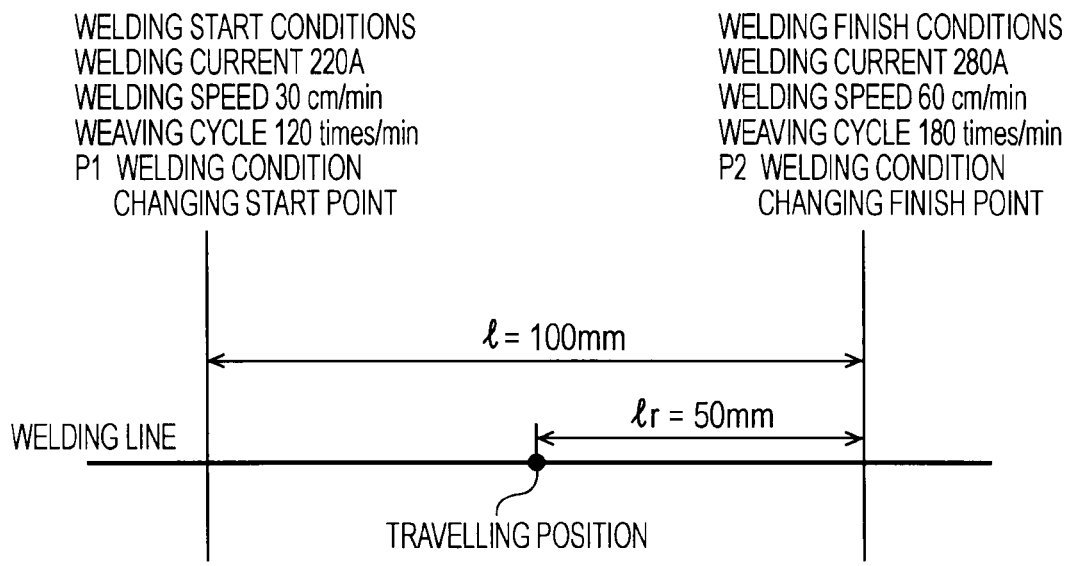

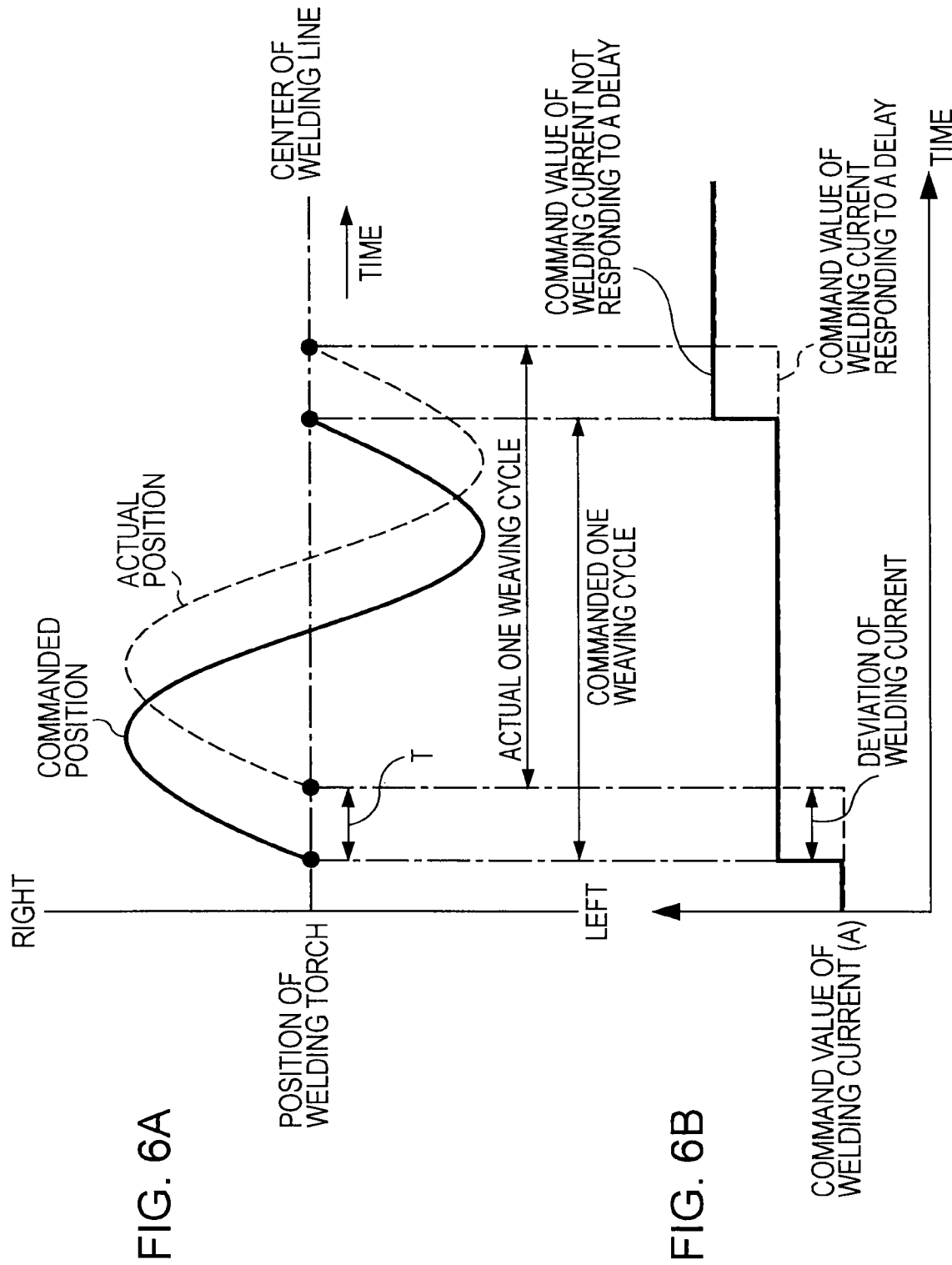

FIG. 9

LINEAR TRAVEL P1
START OF SECTION FOR CONTINUOUSLY CHANGING WELDING CONDITIONS
TANDEM CONDITION MODE RL
PRECEDING WELDING CURRENT 320A, PRECEDING WELDING VOLTAGE 100%, WELDING SPEED 30 cm/min
FOLLOWING WELDING CURRENT 220A, FOLLOWING WELDING VOLTAGE 103%
WEAVING AMPLITUDE 5 mm CYCLE 120 times/min PAUSE AT BOTH ENDS 0.0 sec
ARC ON
LINEAR TRAVEL P2
FINISH OF SECTION FOR CONTINUOUSLY CHANGING WELDING CONDITIONS
PRECEDING WELDING CURRENT 380A, PRECEDING WELDING VOLTAGE 100%, WELDING SPEED 60 cm/min
FOLLOWING WELDING CURRENT 280A, FOLLOWING WELDING VOLTAGE 103%
WEAVING AMPLITUDE 5 mm CYCLE 180 times/min PAUSE AT BOTH ENDS 0.0 sec
ARC OFF

ARC WELDING ROBOT CONTROL SYSTEM AND METHOD THEREOF

BACKGROUND OF THE INVENTION

1. Field of the Invention

The present invention relates to an arc welding robot control system continuously changing welding conditions of an arc welding robot.

2. Description of the Related Art

Hitherto, in arc welding using an arc welding robot, in order to change welding conditions such as a welding current, a welding voltage, a welding speed, a weaving cycle, a weaving amplitude, and the like in stages, it has been required to specify (teach) a plurality of welding-condition changing positions (teaching positions) and to set such welding conditions, which vary from one welding-condition changing position to another, by hand. Since it is so complicated to change welding conditions by hand at every position where welding conditions need to be changed, there have been developed some techniques for changing welding conditions automatically (refer to Japanese Unexamined Utility Model Registration Publication No. S61-138470 and U.S. Pat. No. 6,177,650).

The technique disclosed in Japanese Unexamined Utility Model Registration Publication No. S61-138470, for example, is such that welding conditions of an arc welding robot are changed linearly based on a travelling distance of the welding robot. And, the technique disclosed in U.S. Pat. No. 6,177,650 is such that start and finish points, where welding conditions are changed, are set, welding conditions for each of the start and finish points are set, and then the welding conditions set for the start point are gradually changed so as to meet the welding conditions set for the finish point when a welding torch arrives at the finish point.

In the prior arts disclosed in the above two patent documents, welding conditions are changed while a welding torch performs one cycle of weaving operation and command values of welding currents at both left and right ends of the weaving operation become different to each other, which causes a problem that the thickness of welding bead becomes deviated. In addition, even in the case that an arc welding robot is provided with an arc sensor, since actual values of welding currents at both left and right ends of the weaving operation are different to each other, its welding wire fails to follow a desired welding line and deviates therefrom. Furthermore, an actual weaving operation of a welding torch delays a bit with respect to the commanded weaving operation, and due to the delay the timing when the welding torch completes one weaving cycle and the timing when welding conditions such as a welding current and the like are actually changed deviate from each other, so welding currents at both left and right ends of the weaving operation do not agree with each other; the faster the weaving cycle becomes, the larger the thickness of welding bead becomes deviated.

SUMMARY OF THE INVENTION

Accordingly, it is an object of the present invention to provide an arc welding robot control system, a method thereof and a program thereof that prevent the thickness of welding bead from becoming deviated even in the case in which an arc welding robot performs a weaving operation, and solve the problems described above.

In addressing the above problems, the present invention provides a control system for an arc welding robot for welding work pieces while performing a weaving operation at a predetermined movement pattern, including a memory device for storing a welding condition changing start point, a welding condition changing finish point, welding conditions at the welding condition changing start point, and welding conditions at the welding condition changing finish point, the welding conditions at the welding condition changing start point and the welding conditions at the welding condition changing finish point each including a weaving cycle, a weaving amplitude, and at least one of a welding current, a welding voltage and a welding speed; a weaving-movement controlling device for producing a weaving operation command allowing a welding torch of the arc welding robot to perform a weaving operation at the predetermined movement pattern, and also for outputting a signal of completion of one weaving cycle every time when the welding torch completes to perform one weaving cycle of the predetermined movement pattern according to a weaving operation command; a welding condition changing position calculating device for calculating a travelling position of the welding torch having travelled from the welding condition changing start point toward the welding condition changing finish point; a welding condition calculating device for calculating a correction value corresponding to a distance from the welding condition changing start point to the travelling position, based on a difference between the welding conditions at the welding condition changing start point and the welding conditions at the welding condition changing finish point, and for determining to-be-changed welding conditions at the travelling position by adding the correction value to the welding conditions at the welding condition changing start point; and a welding condition changing device for changing welding conditions for the arc welding robot based on the to-be-changed welding conditions at the travelling position every time when the signal of completion of one weaving cycle is input.

With this configuration, the arc welding robot control system changes welding conditions of an arc welding robot every time when a welding torch completes to perform one weaving cycle, based on to-be-changed welding conditions at a travelling position, while the welding torch of the arc welding robot is positioned between a welding condition changing start point and a welding condition changing finish point. The arc welding robot control system therefore does not change the welding conditions during the welding torch is performing one cycle of weaving operation. Here, the arc welding robot control system is able to set a welding condition changing start point, a welding condition changing finish point, welding conditions at the welding condition changing start point, and welding conditions at the welding condition changing finish point freely depending on a shape of welding groove, and a shape, material and size of each work piece.

The above arc welding robot control system further includes a weaving operation delay-time adjusting device for allowing the welding condition changing device to change the welding conditions for the arc welding robot after a delay time has passed, the delay time being defined as a time period from when the signal of completion of one weaving cycle is input to the welding condition changing device to when the welding torch completes to perform one weaving cycle of the predetermined movement pattern.

With this configuration, the arc welding robot control system allows the welding condition changing device to change welding conditions when the welding torch arrived at the center of welding line, after being delayed for a delay time by the weaving operation delay-time adjusting device, the delay time being due to a filtering delay, a mechanical delay, or the like. Normally, the faster the weaving cycle becomes, the larger the influence of a delay becomes, but even in such a case, this arc welding robot control system can reduce the influence of such a delay.

The control system for an arc welding robot according to the present invention can be applied to a tandem-type arc welding system which comprises a welding torch having a preceding electrode and a following electrode at the end thereof and two welding power sources for the preceding electrode and for the following electrode. In this case, the memory means stores welding conditions at the welding condition changing start point for the preceding electrode, welding conditions at the welding condition changing start point for the following electrode, welding conditions at the welding condition changing finish point for the preceding electrode, and welding conditions at the welding condition changing finish point for the following electrode, and the welding condition calculating means determines to-be-changed welding conditions at the travelling position of each of the preceding electrode and the following electrode.

The present invention also provides a method for controlling an arc welding robot for welding work pieces while performing a weaving operation at a predetermined movement pattern, consisting of a storing step for storing a welding condition changing start point, a welding condition changing finish point, welding conditions at the welding condition changing start point, and welding conditions at the welding condition changing finish point in a memory device, the welding conditions at the welding condition changing start point and the welding conditions at the welding condition changing finish point each including a weaving cycle, a weaving amplitude, and at least one of a welding current, a welding voltage and a welding speed; a weaving-movement controlling step for producing a weaving operation command allowing a welding torch of the arc welding robot to perform a weaving operation at the predetermined movement pattern, and also for outputting a signal of completion of one weaving cycle every time when the welding torch completes to perform one weaving cycle of the predetermined movement pattern according to a weaving operation command; a welding condition changing position calculating step for calculating a travelling position of the welding torch having travelled from the welding condition changing start point toward the welding condition changing finish point; a welding condition calculating step for calculating a correction value corresponding to a distance from the welding condition changing start point to the travelling position, based on a difference between the welding conditions at the welding condition changing start point and the welding conditions at the welding condition changing finish point, and for determining to-be-changed welding conditions at the travelling position by adding the correction value to the welding conditions at the welding condition changing start point; and a welding condition changing step for changing welding conditions for the arc welding robot based on the to-be-changed welding conditions at the travelling position every time when the signal of completion of one weaving cycle is input.

According to an arc welding robot control system and a method thereof according to the present invention, the following excellent effects can be provided. That is, even in the case in which an arc welding robot performs a weaving operation, since welding conditions are changed every time when its welding torch completes one weaving cycle, it is prevented that the thickness of welding bead becomes deviated. Moreover, according to a system further including a weaving operation delay-time adjusting device, even in the case in which a fast weaving cycle is performed, it is possible to prevent the thickness of welding bead to become deviated and to reduce the influence of a delay; thereby it becomes possible to perform an accurate arc welding.

BRIEF DESCRIPTION OF THE DRAWINGS

FIG. 3 is an explanatory sheet showing an example of welding conditions planned to be input into the control system in FIG. 1;

FIG. 4 is an explanatory drawing showing a welding line between work pieces for explaining a change in welding conditions in the present invention;

FIG. 6A is an explanatory drawing showing weaving tracks of a welding torch of an arc welding robot according to the present invention;

FIG. 6B is an explanatory drawing showing command values of welding currents corresponding to positions of the welding torch;

FIG. 9 is an explanatory sheet showing an example of welding conditions to be input into the control system for the tandem-type arc welding robot in FIG. 1.

DESCRIPTION OF THE PREFERRED EMBODIMENTS

1. Overview of the Control System

Figure 1:
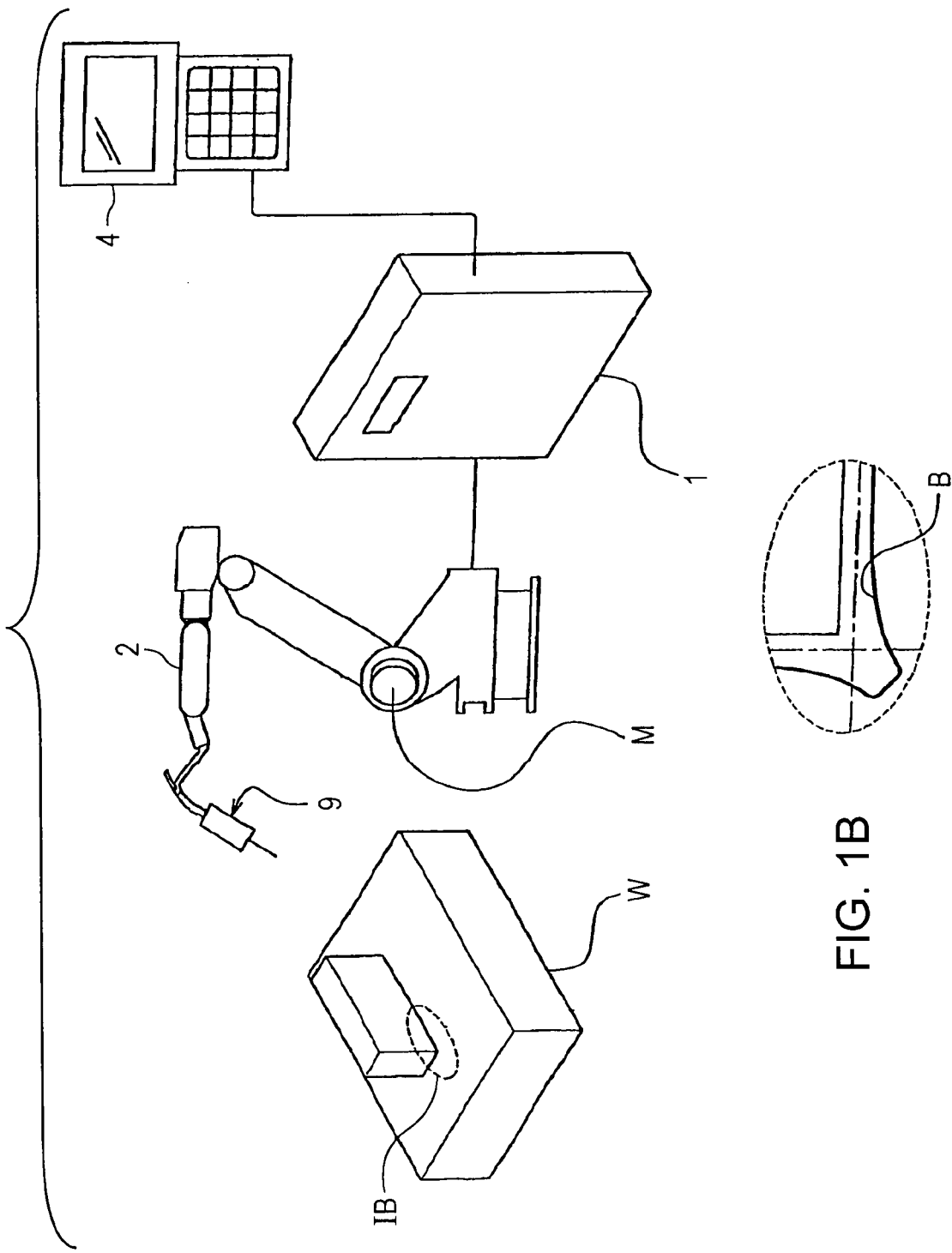
FIG. 1A is a schematic overview of an arc welding system including a control system according to the present invention.
FIG. 1B is a magnified view of work pieces and a welding bead which are denoted with the mark "IB" in FIG. A.

An embodiment of the present invention will now be described below in detail with reference to the attached drawings. First, a configuration outline of a control system will be described with reference to FIGS. 1A, 1B. FIG. 1A is a schematic overview of an arc welding system including a control system according to the present invention, and FIG. 1B is a magnified view of work pieces and a welding bead which are denoted with the mark "IB" in FIG. 1A. In FIG. 1A, there are shown a control system (an arc welding robot control system) 1, an arc welding robot 2, a teaching pendant 4, a welding torch 9 and work pieces W; the work pieces W and a welding bead B are also shown in FIG. 1B.

A control system 1 connected to an arc welding robot 2 and a teaching pendant 4 serves to control the arc welding robot 2 and to change welding conditions of the arc welding robot 2 based on a command or a teaching program, which is input from the teaching pendant 4.

The arc welding robot 2 may be, for example, a vertical 6-axis multiarticular robot and is provided with a welding torch 9 on a wrist portion thereof. The arc welding robot 2 is able to allow the welding torch 9 to travel along a welding line between work pieces W by driving an arc welding robot motor M based on a travel command from the control system 1. It should be noted that, although one arc welding robot motor M is shown in FIG. 1A for an explanation purpose, the number of motors is not limited and in the case that, for example, the arc welding robot 2 is a vertical 6-axis multiarticular robot, it is provided with six arc welding robot motors M.

The welding torch 9 feeds a welding wire (not shown) toward the welding line between the work pieces W. Between the fed welding wire and the work pieces W along the welding line, an arc discharge is generated and thereby an arc welding is performed. The welding torch 9 is connected to a welding power source via a wire feeding unit (not shown), the welding power source being connected to the control system 1. Based on a welding command output from the control system 1, the welding power source supplies power for driving the wire feeding unit, and thereby the welding wire is fed to the welding torch 9. It should be noted that the arc welding robot 2 may be of a tandem type that is equipped with two welding torches 9.

The control system 1 includes, for example, a sensor computer, which serves to detect welding currents at the left and right ends of weaving using an arc sensor, based on a correlation between a change in welding currents and a projected length of the welding wire of the arc welding robot 2.

The teaching pendant 4 serves to input a teaching program, welding conditions at a welding condition changing start point and welding conditions at a welding condition changing finish point when a process of teaching the arc welding robot 2 is executed. The teaching pendant 4 also serves to output a command for stopping the arc welding robot 2 to the control system 1 by being manipulated by an operator. It is noted that although the teaching pendant 4 is connected to the control system 1 through a wired communication circuit, it may be connected through a wireless communication circuit. Alternatively, the teaching pendant 4 may be provided with a medium such as a Compact Flash (trademark) card or the like in which a teaching program is stored, and the control system 1 may read the teaching program from the medium.

The work pieces W are metal members or the like to be arc-welded together. In the case shown in FIG. 1B, the control system 1 continuously changes welding conditions such as a weaving cycle, a weaving amplitude, and the like so as to form a welding bead B, so-called a "beard bead".

2. Configuration of the Control System

Figure 2:
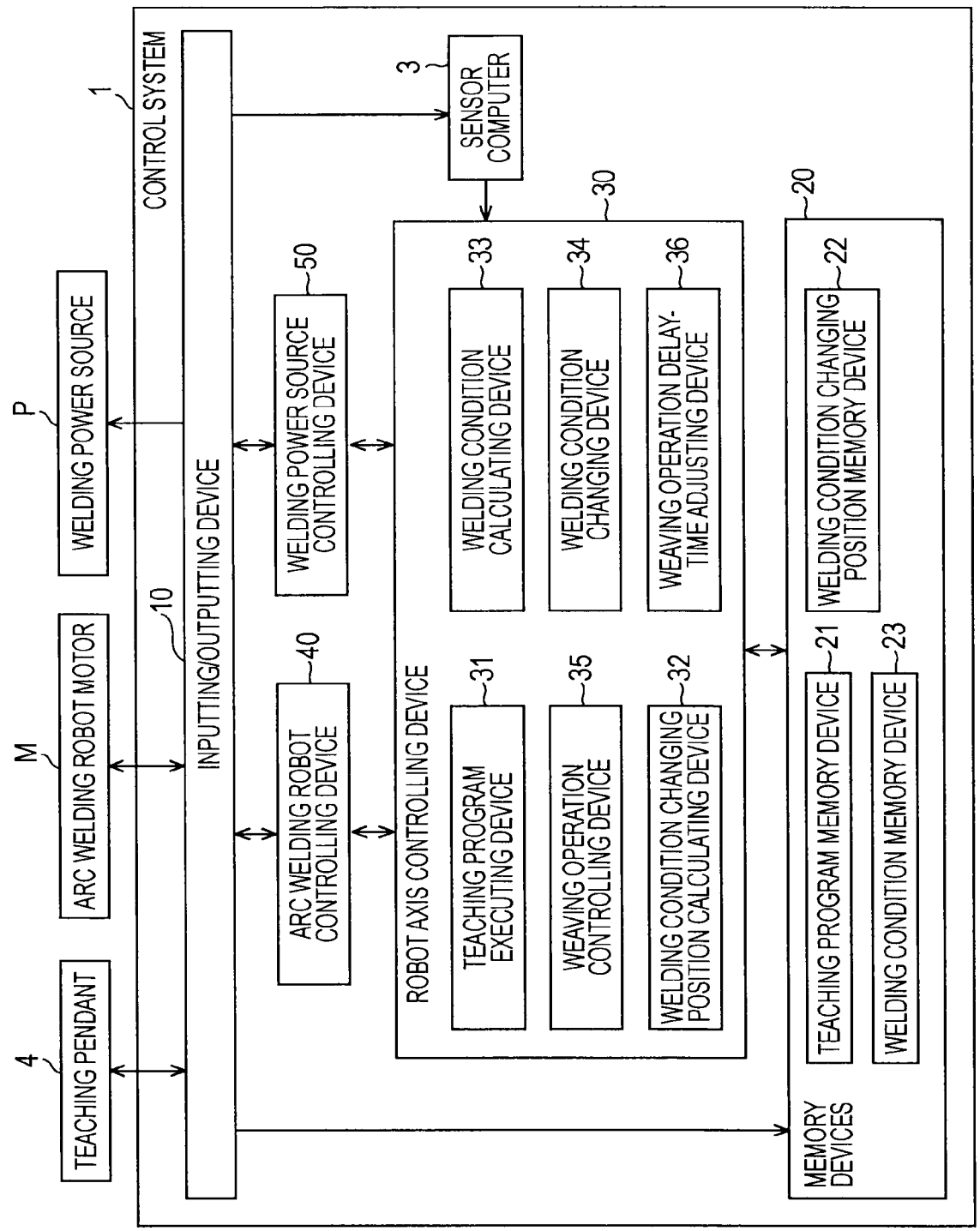
FIG. 2 is a block diagram showing the configuration of the control system in FIG. 1 schematically.

The configuration of the control system 1 will be described with reference to FIG. 2, which is a block diagram showing the configuration of the control system in FIG. 1 schematically. The control system 1 is composed of, for example, a CPU (Central Processing Unit), a ROM (Read Only Memory), a RAM (Random Access Memory) a HDD (Hard Disk Drive) and an input/output interface. And, the control system 1 is provided with a sensor computer 3, an inputting/outputting device 10, memory devices 20, a robot axis controlling device 30, an arc welding robot controlling device 40 and a welding power source controlling device to actualize a variety of functions described later.

The inputting/outputting device 10 is composed of specified input and output interfaces. Although the inputting/outputting device 10 is shown to be integrated in FIG. 2 for convenience to explain, it should be understood that it may be separated into individual devices. This inputting/outputting device 10 serves to output the command and teaching program, which are input from the teaching pendant 4, to the memory devices 20 and the robot axis controlling device 30. The inputting/outputting device 10 also outputs a welding command produced by a welding power source controlling device 50 to a welding power source P.

Additionally, the inputting/outputting device 10 outputs a command from the arc welding robot controlling device 40 to the arc welding robot motor M, and also outputs the position of the welding torch 9 and other feedback signals from the arc welding robot motor M and a feedforward signal to the arc welding robot controlling device 40.

The memory devices 20 are composed of, for example, a ROM, a RAM, a HDD and the like, and provided with a teaching program memory device 21, a welding condition changing position memory device 22 and a welding condition memory device 23. Furthermore, it is desirable that, in preparation for the case where arc welding is interrupted due to welding wire cut or nozzle contact, the memory devices 20 store the remaining distance described later and to-be-changed welding conditions at the calculated travelling position. With this, even if the arc welding is interrupted when welding conditions are changed, the control system 1 enables the arc welding to be restarted by reading the remaining distance and the to-be-changed welding conditions at the travelling position from the memory devices 20. Although the memory devices 20 are shown to be integrated in FIG. 2 for convenience to explain, it should be understood that it may be separated into individual devices.

The teaching program memory device 21 serves to store a teaching program in which a command to the arc welding robot 2 and the like are described. The teaching program stored in the teaching program memory device 21 is created in advance, and is editable by manipulating a connected device (not shown) such as the teaching pendant 4, a personal computer, or the like.

The welding condition changing position memory device 22 serves to store a welding condition changing start point and a welding condition changing finish point. Here, the welding condition changing start point is a position where welding condition changing is started, and it is not limited to one position, but may be set at plural positions. Likewise, the welding condition changing finish point is a position where welding condition changing is finished, and located in a position following the welding condition changing start point. The welding condition changing finish point is also not limited to one position, but may be set at the same number of positions as the welding condition changing start points.

The welding condition memory device 23 serves to store welding conditions at the welding condition changing start point and welding conditions at the welding condition changing finish point. An example of welding conditions will be described with reference to FIG. 3. FIG. 3 is an explanatory sheet showing an example of welding conditions to be input into the control system in FIG. 1.

First, "START OF SECTION FOR CONTINUOUSLY CHANGING WELDING CONDITIONS" means that P1 is the position where welding condition changing is started. "LINEAR TRAVEL" means that a welding torch 9 travels linearly toward the position P1 set on the work pieces W. "ARC ON" means to perform arc welding. Welding conditions at the position P1 are indicated such that the welding current is 220 A, the welding voltage is 100% of the specified voltage, the welding speed is 30 cm/min, the weaving cycle is 120 times/min and the weaving amplitude of 5 mm. It is noted that although pause times at both ends, which means that the welding torch 9 pauses at both left and right ends toward the travelling direction of weaving operation, are not set in this example, the pause times at both ends may be set.

"FINISH OF SECTION FOR CONTINUOUSLY CHANGING WELDING CONDITIONS" means that P2 is the position where welding condition changing is finished. Welding conditions at the position P2 are indicated such that the welding current is 280 A, the welding voltage is 100% of the specified voltage, the welding speed is 60 cm/min, the weaving cycle is 180 times/min and the weaving amplitude is 5 mm. The control system 1 therefore continuously increases the weaving cycle from 120 to 180 times/min, the welding current from 220 to 280 A, and the welding speed from 30 to 60 cm/min continuously during from the position P1 to the position P2. It is noted that the control system 1 may change a part of welding conditions such as the welding current, the welding speed and the weaving cycle at the welding condition changing start point and also at the welding condition changing finish point, or may change all of the welding conditions at the welding condition changing start point and at the welding condition changing finish point.

The robot axis controlling device 30 executes a command coded in a teaching program to change welding conditions, and includes, for example, a teaching program executing device 31, a welding condition changing position calculating device 32, a welding condition calculating device 33, a welding condition changing device 34 and a weaving operation controlling device 35.

The teaching program executing device 31 reads the teaching program from the teaching program memory device 21 to execute the command coded in the teaching program. At this time, the teaching program executing device 31 judges whether or not the welding torch 9 has arrived at a predetermined teaching point, based on a signal indicating the position where the welding torch 9 is travelling, and executes the command set at the teaching point when the signal indicates that the welding torch 9 has arrived at the teaching point.

The welding condition changing position calculating device 32 determines a travelling position of the welding torch 9 of the arc welding robot 2, which is travelling from a welding condition changing start point toward a welding condition changing finish point, by interpolation calculating. Moreover, in the case when the interpolated position goes beyond the welding condition changing start point, the welding condition changing position calculating device 32 calculates the travelling position from the difference between the interpolated position and the welding condition changing start point. Here, the interpolated position denotes a position interpolated between teaching points.

The weaving operation controlling device 35 produces a weaving operation command for allowing the welding torch 9 to perform a weaving operation in accordance with a predetermined movement pattern from, for example, a weaving cycle and a weaving amplitude input as welding conditions. Then, the weaving operation controlling device 35 outputs the produced weaving operation command to the arc welding robot motor M via the arc welding robot controlling device 40. In addition, the weaving operation controlling device 35 outputs a signal of completion of one weaving cycle to the welding condition calculating device 33 or the welding condition changing device 34 every time when the welding torch 9 completes to perform one weaving cycle of the predetermined movement pattern according to the weaving operation command.

The welding condition calculating device 33 calculates correction values corresponding to the distance from the welding condition changing start point to a travelling position, based on differences between the welding conditions at the welding condition changing start point and at the welding condition changing finish point, and then determines to-be-changed welding conditions by adding the correction values to the welding conditions at the welding condition changing start point.

2-1. Calculation of to-be-Changed Welding Conditions

Calculation of to-be-changed welding conditions at a travelling position will be described in detail with reference to FIG. 4. FIG. 4 is an explanatory drawing showing a welding line between work pieces for explaining a change in welding conditions in the present invention. In FIG. 4, there are shown a welding line, a travelling position, a welding condition changing start point P1 and a welding condition changing finish point P2, and the entire distance from the welding condition changing start point P1 to the welding condition changing finish point P2 is denoted with the mark "l" and a remaining distance from the travelling position to the welding condition changing finish point P2 is denoted with the mark "$l_\gamma$".

Among to-be-changed welding conditions at a travelling position, a welding speed, a weaving cycle and a weaving amplitude can be calculated at the welding condition calculating device 33 using following equation (1), wherein a difference between welding conditions at the welding condition changing start point and at the welding condition changing finish point is referred to as a welding condition difference. In the equation (1), a to-be-changed welding condition is denoted as CWC1, an entire distance is denoted as ED, a remaining distance is denoted as RD, a welding condition difference is denoted as DWC, and a welding condition at a welding condition changing start point is denoted as SWC. The term {(ED−RD)/ED}×DWC becomes a correction value corresponding to the distance from the welding condition changing start point to the travelling position, and the welding condition calculating device 33 determines to-be-changed welding conditions at the travelling position by adding this correction value to the welding conditions at the welding condition changing start point. Incidentally, in the case that a value of the welding conditions at the welding condition changing start point is larger than that of the welding conditions for the welding condition changing finish point, the correction value becomes negative, and the welding condition calculating device 33 adds the negative value to the welding conditions at the welding condition changing start point, i.e., deducts the correction value from the welding conditions at the welding condition changing start point.

$$CWC1=\{(ED-RD)/ED \times DWC+SWC \tag{1}$$

For example, if the weaving cycle of welding conditions at a welding condition changing start point is 120 times/min, the weaving cycle of welding conditions at a welding condition changing finish point is 180 times/min, the entire distance "l" is 100 mm and the remaining distance "$l_\gamma$" is 50 mm, the weaving cycle at the travelling point becomes 150 times/min, as follows.

$$150 \text{ times/min}=\{(100-50)/100\} \times (180-120)+120$$

Likewise, if the welding speed of welding conditions at a welding condition changing start point is 30 cm/min, the welding speed of welding conditions at a welding condition changing finish point is 60 cm/min, the entire distance "l" is 100 mm and the remaining distance "$l_\gamma$" is 50 mm, the welding speed at the travelling point becomes 45 cm/min, as follows.

$$45 \text{ cm/min}=\{(100-50)/100\} \times (60-30)+30$$

Furthermore, among to-be-changed welding conditions at a travelling position, a welding current and a welding voltage can be calculated at the welding condition calculating device 33 using following equation (2). In the equation (2), a to-be-changed welding condition is denoted as CWC2, a welding speed is denoted as WS, a weaving cycle is denoted as WC. The term {ED−(RD−WS/WC)}/ED×DWC becomes a correction value corresponding to the distance from the welding condition changing start point to the travelling position, and the welding condition calculating device 33 determines to-be-changed welding conditions at the travelling position by adding the correction value to the welding conditions at the welding condition changing start point. It is noted that the welding condition calculating device 33 obtains the distance in which the welding torch 9 performs one weaving cycle by dividing the welding speed by the welding cycle every time when the welding torch 9 completes to perform one weaving cycle.

$$CWC2=\{ED-(RD-WS/WC)\}/ED \times DWC+SWC \quad (2)$$

For example, if the welding current of welding conditions at a welding condition changing start point is 220 A, the welding current of welding conditions at a welding condition changing finish point is 280 A, the entire distance "l" is 100 mm, the remaining distance "$l_y$" is 50 mm, the weaving cycle is 150 times/min and the welding speed is 450 mm/min, the weaving current at the travelling point becomes 251.8 A, as follows.

$$251.8\ A=\{100-(50-450/150)\}/100 \times (280-220)+220$$

Returning to refer to FIG. 2, the configuration of the control system 1 will be continuously described below. The welding condition changing device 34 includes a weaving operation delay-time adjusting device 36, and serves to change welding conditions of the arc welding robot 2 based on the to-be-changed welding conditions at a travelling position, which have been obtained by calculation at the welding condition calculating device 33, every time when a signal of completion of one weaving cycle is input from the weaving operation controlling device 35. In the case when a welding current and/or a welding voltage of the to-be-changed welding conditions at a travelling position need to be changed, the welding condition changing device 34 also outputs a signal to the welding power source controlling device 50 for allowing the welding power source P to change the welding current and/or the welding voltage. Likewise, in the case when a weaving cycle and a weaving amplitude of the to-be-changed welding conditions at a travelling position need to be changed, the welding condition changing device 34 outputs the changed values of the weaving cycle and the weaving amplitude to the weaving operation controlling device 35. Then, the weaving operation controlling device 35 produces a weaving operation command from the changed values of the weaving cycle and the weaving amplitude to output to the arc welding robot controlling device 40. Moreover, in the case when a welding speed of the to-be-changed welding conditions at a travelling position need to be changed, the welding condition changing device 34 outputs the changed value of the welding speed to the welding condition changing position calculating device 32. Then, the welding condition changing position calculating device 32 calculates an interpolated position by substituting the changed value of the welding speed in the interpolation calculation equation to update the previous value, and outputs the interpolated position to the arc welding robot motor M via the arc welding robot controlling device 40.

The arc welding robot controlling device 40 outputs a travel command and a weaving operation command received from the robot axis controlling device 30 to the arc welding robot motor M. The arc welding robot controlling device 40 also outputs a feedback signal, a feedforward signal and other signals received from the arc welding robot motor M to the robot axis controlling device 30. The arc welding robot motor M serves to drive the arc welding robot 2 for allowing the welding torch 9 to travel according to the above travel command and to perform a weaving operation according to the weaving operation command, while it changes a weaving cycle and a weaving amplitude.

The welding power source controlling device 50 outputs a welding command received from the robot axis controlling device 30 to the welding power source P. And, the welding power source P changes a welding current and a welding voltage according to the welding command received from the welding power source controlling device 50.

2-2. Reduction of Influence of Delay

Figure 5A:
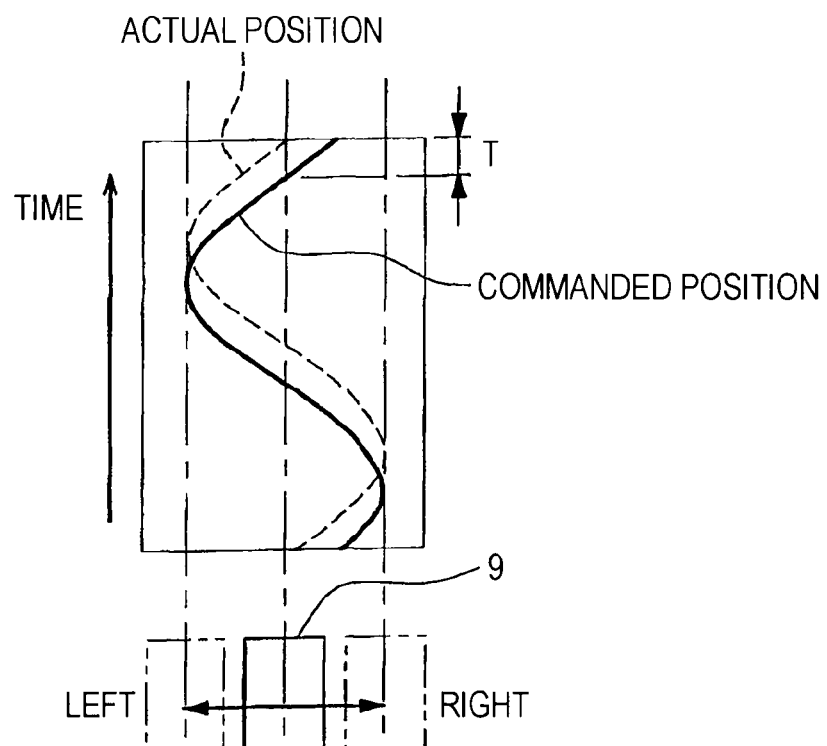
FIG. 5A is an explanatory drawing showing tracks of a welding torch of an arc welding robot according to the present invention.
Figure 5B:
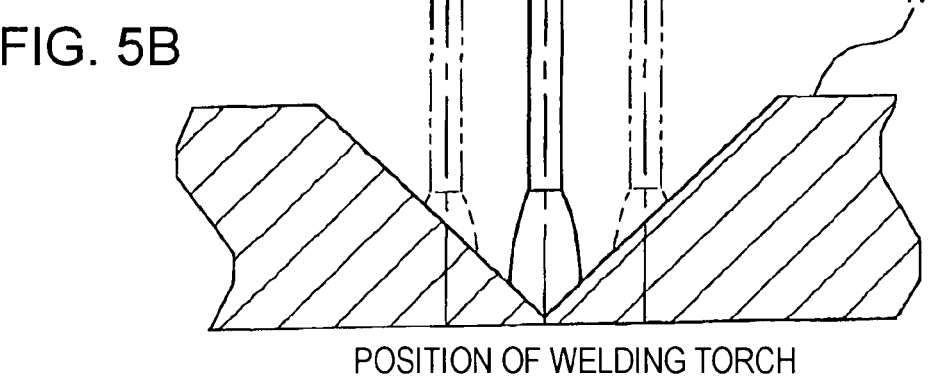
FIG. 5B is an explanatory drawing showing a weaving operation of the welding torch of the arc welding robot according to the present invention.

When a filtering delay, a mechanical delay, or another delay occurs, how the control system 1 reduces the influence thereof will be described below with reference to FIGS. 5A, 5B, 6A and 6B. FIG. 5A is an explanatory drawing showing tracks of a welding torch of an arc welding robot according to the present invention, and FIG. 5B is an explanatory drawing showing a weaving operation of the welding torch of the arc welding robot according to the present invention. It is noted that, in FIG. 5A, the progress of time is indicated by an arrow, the position of the welding torch 9 according to a weaving operation command (commanded position) is indicated by a solid line, the actual position of the welding torch 9 (actual position) is indicated by a dashed line, and a delay time is denoted by reference mark As shown in FIG. 5B, the welding torch travels on a welding line while weaving left and right. At this time, there might be a case that a filtering delay in the arc welding robot controlling device 40, a mechanical delay, or another delay occurs in the control system 1, the mechanical delay being a time from when a travel command or a weaving operation command is output from the arc welding robot controlling device 40 to when the arc welding robot motor M is started to be driven. When a delay occurs, an actual position of the welding torch 9 delays from the commanded position by the delay time T, as shown in FIG. 5A. Since the delay time T is caused of the characteristics of the arc welding robot 2, the delay time T may be obtained in advance and stored in the memory devices 20. Then, the weaving operation delay-time adjusting device 36 may refer to the delay time T stored in the memory devices 20.

The control system 1 reduces the influence of the delay in the following manner. FIG. 6A is an explanatory drawing showing weaving tracks of a welding torch of an arc welding robot according to the present invention, and FIG. 6B is an explanatory drawing showing command values of welding currents corresponding to positions of the welding torch. It is noted that, in FIG. 6A, the progress of time is indicated by an arrow, the position of the welding torch 9 according to a weaving operation command (commanded position) is indicated by a solid line, the actual position of the welding torch 9 (actual position) is indicated by a dashed line, and a delay time is denoted by reference mark "T". Likewise, in FIG. 6B, the command value of welding current which does not respond to a delay in the case of the present invention is indicated by a solid line, the command value of welding current which responds to a delay in the case of the present invention is indicated by a dashed line, and the deviation between the timing when the welding torch 9 completes one weaving cycle according to a weaving operation command and the timing when the welding current is actually changed is indicated as the deviation of welding current.

In the case of no delay, the both commanded and actual positions of the welding torch 9 agree with each other (the both solid and dashed lines overlap one another in FIG. 6A), and the timing when the welding torch 9 actually completes one weaving cycle and the timing when the welding condition changing device 34 outputs a command for changing a welding current to the welding power source P (timing when the signal of completion of one weaving cycle is input to the welding condition changing device 34) also agree with each other. In the case of delay, however, the timing when the welding torch 9 actually completes one weaving cycle and the timing when the welding condition changing device 34 outputs a command for changing a welding current to the welding power source P deviate with each other (refer to the actual position of welding torch in FIG. 6A and the command value of welding current not responding to a delay in FIG. 6B). In this case, the welding current needs to be changed when the welding torch 9 has actually completed one weaving cycle and the delay time T has passed (refer to deviation of welding current in FIG. 6B).

For this reason, the weaving operation delay-time adjusting device 36 allows the welding condition changing device 34 to change welding conditions of the arc welding robot upon passage of the delay time from when a signal of completion of one weaving cycle is input. For example, the weaving operation delay-time adjusting device 36 outputs a waiting signal to the welding condition changing device 34 in advance. The welding condition changing device 34 that has received the waiting signal does not output a command for changing the welding current to the welding power source P until receiving a signal of the delay time T from the weaving operation delay-time adjusting device 36. Then, the weaving operation delay-time adjusting device 36 calculates the delay time T and outputs a signal including the delay time T (delay time signal) to the welding condition changing device 34, which outputs a command for changing a welding current to the welding power source P upon receipt of the delay time signal. The control system 1 thus allows the timing when the welding torch 9 actually completes one weaving cycle and the timing when the welding condition changing device 34 outputs a command for changing a welding current to the welding power source P to agree with each other, and can reduce the influence of the delay (refer to the actual position of welding torch in FIG. 6A and the command value of welding current responding to a delay in FIG. 6B). It should be noted that the control system 1 may be allowed to function so that a command for changing a welding voltage responds to the delay as with the case for the welding current described above.

3. Operation of the Control System

Figure 7:
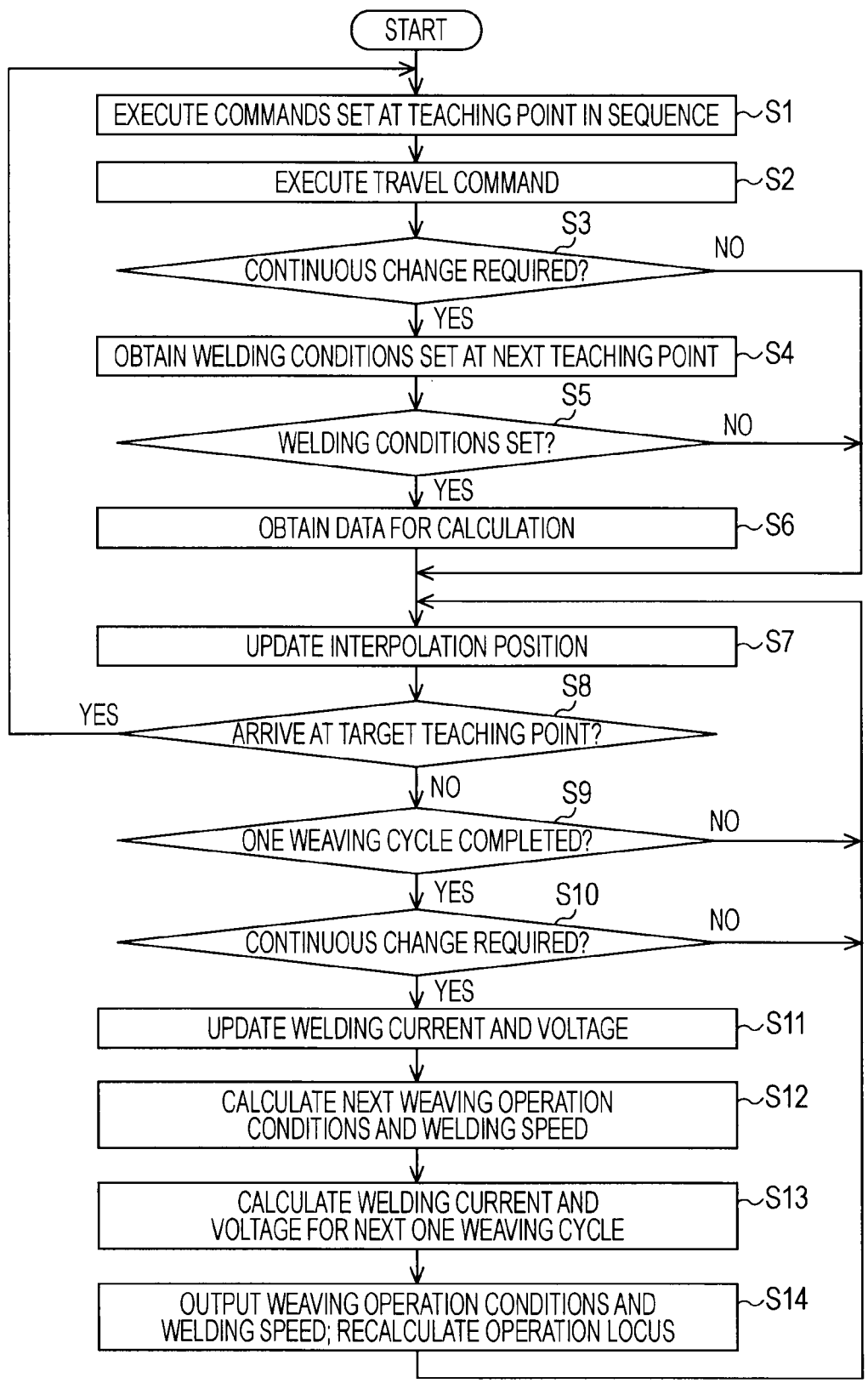
FIG. 7 is a flowchart showing an operation of the control system depicted in FIG. 2.

The operation of the control system according to the present invention will be described with reference to FIG. 7. FIG. 7 is a flowchart showing an operation of the control system depicted in FIG. 2. It is noted that the control system 1 stores welding conditions and the like in advance in the memory devices 20.

The operation will be described below on the precondition that the welding torch 9 has arrived at a teaching point. First, the teaching program executing device 31 of the control system 1 executes commands set at the teaching point in order (step S1), and outputs a travel command to the arc welding robot motor M via the arc welding robot controlling device 40, the travel command being for allowing the welding porch 9 to travel to a next teaching point coded in a teaching program (step S2).

The welding condition changing position calculating device 32 of the control system 1 determines whether or not to change welding conditions continuously (step S3). In the case of changing the welding conditions continuously, the control system 1 implements the process of step S4 ("YES" at step S3). In the case of not changing the welding conditions continuously, on the other hand, the control system 1 implements the process of step S7 ("NO" at step S3) If "YES" at step S3, the control system 1 obtains welding conditions set at a next teaching point from the memory devices 20 (step S4), and judges if welding conditions at a welding condition changing start point and welding conditions at a welding condition changing finish point are set at the welding condition memory device 23 (step S5). Then, if welding conditions at the welding condition changing start point and welding conditions at the welding condition changing finish point are set, the control system 1 implements the process of step S6 ("YES" at step S5). If welding conditions at the welding condition changing start point and welding conditions at the welding condition changing finish point are not set, on the other hand, the control system 1 implements the process of step S7 ("NO" at step S5).

If "YES" at step S5, the welding condition changing position calculating device 32 of the control system 1 obtains data for calculation by reading a welding condition changing start point and a welding condition changing finish point from the welding condition changing position memory device 22, and also by reading welding conditions at the welding condition changing start point and welding conditions at the welding condition changing finish point from the welding condition memory device 23 (step S6). After the process of S6 is implemented, the welding torch 9 starts to travel toward a next teaching point. Moreover, the welding condition changing position calculating device 32 of the control system 1 determines an interpolated position of the welding torch 9 between teaching points at every control cycle by using a method of interpolation calculation such as linear interpolation, arc interpolation, or the like, and outputs the interpolated position to the arc welding robot motor M via the arc welding robot controlling device 40 (step S7).

The teaching program executing device 31 of the control system 1 determines whether or not the welding torch 9 has arrived at an aiming teaching point (step S8). If the welding torch 9 has arrived at the teaching point, the control system 1 returns to the process of step S1 ("YES" at step S8). If the welding torch 9 has not arrived at the teaching point, on the other hand, the control system 1 implements the process of step S9 ("NO" at step S8).

If "NO" at step S8, the weaving operation controlling device 35 of the control system 1 judges if the welding torch 9 has completed one weaving cycle (step S9). If the welding torch 9 has completed one weaving cycle, the control system 1 implements the process of step S10 ("YES" at step S9). If the welding torch 9 has not completed one weaving cycle, on the other hand, the control system 1 returns to the process of step S7 ("NO" at step S9). If "YES" at step S9, the welding condition changing position calculating device 32 of the control system 1 determines whether or not to change a welding condition continuously (step S10). In the case of changing the welding condition continuously, the control system 1 implements the process of step S11 ("YES" at step S10). In the case of not changing the welding condition continuously, on the other hand, the control system 1 returns to the process of step S7 ("NO" at step S10).

If "YES" at step S10, the welding condition changing device 34 of the control system 1 outputs a welding current and a welding voltage of welding conditions to the welding power source P (step S11), the welding current and welding voltage being preliminarily calculated. In the case when a delay has occurred, the welding condition changing device 34 of the control system 1 outputs the welding current and welding voltage to the welding power source P after being held for the delay time at the weaving operation delay-time adjusting device 36. In addition, the welding condition calculating device 33 of the control system 1 calculates a weaving cycle and a weaving amplitude, both being of weaving operation conditions, and also a welding speed of to-be-changed welding conditions at a travelling position (step S12). The welding condition calculating device 33 of the control system 1 also calculates a welding current and a welding voltage of to-be-changed welding conditions at a travelling position when the next cycle of weaving operation is completed (step S13). After this, the welding condition changing device 34 of the control system 1 outputs the weaving cycle and weaving amplitude, both being of weaving operation conditions, of to-be-changed welding conditions at a travelling position to the weaving operation controlling device 35, and outputs the updated welding speed to the welding condition changing position calculating device 32; then the control system 1 recalculates the operation locus of the welding torch 9 to return to the process of step S7 (step S14).

It should be noted that the control system 1 allows a general computer to operate with a program having the same functions as those of the devices described above. Such a program may be provided over a communications circuit, or by being written into a recording medium such as a CD, a ROM, a flush memory, or the like. It is also noted that although a section from a welding condition changing start point to a welding condition changing finish point is set as one section, the section may be two or more sections.

In the next place, another embodiment, in which a control system 1 according to the present invention is applied to a tandem-type arc welding robot, will be described below.

Figure 8:
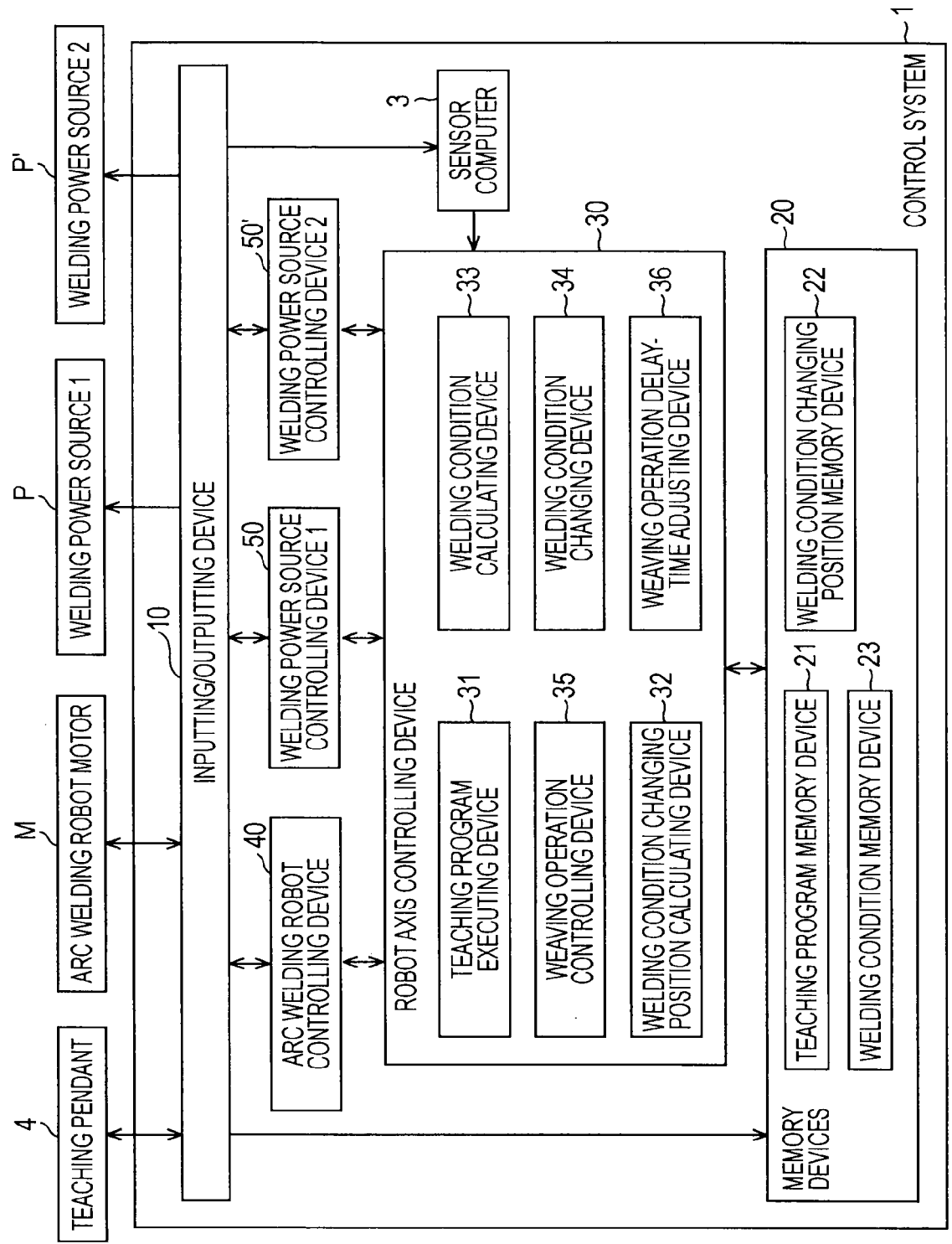
FIG. 8 is a block diagram showing the configuration of the control system for an arc welding robot in FIG. 1 schematically, the arc welding robot being of a tandem type.

In the case of a tandem-type arc welding robot, two welding power sources for a preceding electrode and a following electrode are connected to the control system 1. Accordingly, as shown in FIG. 8, two welding power source controlling devices (a welding power source controlling device 1 and a welding power source controlling device 2) are provided for the two welding power sources (a welding power source 1 and a welding power source 2), respectively. Note that one of the two electrodes is defined as L-electrode and the other is defined as R-electrode to distinguish the both electrodes.

Into a welding condition memory device 23 applied to a tandem-type arc welding robot, welding conditions as shown in, for example, FIG. 9 are input. There is an item particular to tandem welding, called a "tandem condition", by which it is instructed whether tandem welding or single welding is to be performed. The instruction of "Mode RL", for example, indicates that R-electrode is a preceding electrode and L-electrode is a following electrode. The welding conditions when welding is started at the position P1 the welding current and welding voltage of the preceding electrode are 320 A and 100% of the specified voltage, the welding current and welding voltage of the following electrode are 220 A and 103% of the specified voltage, the welding speed is 30 cm/min, the weaving cycle is 120 times/min, and the weaving amplitude is 5 mm. The welding conditions when welding is finished at the position P2 are indicated such that the welding current and welding voltage of the preceding electrode are 380 A and 100% of the specified voltage, the welding current and welding voltage of the following electrode are 280 A and 103% of the specified voltage, the welding speed is 60 cm/min, the weaving cycle is 180 times/min, and the weaving amplitude is 5 mm.

The control system 1 therefore continuously increases the weaving cycle from 120 to 180 times/min, the welding current of the preceding electrode from 320 to 380 A, the welding current of the following electrode from 220 to 280 A, and the welding speed from 30 to 60 cm/min continuously during from the position P1 to the position P2.

The calculation of to-be-changed welding conditions at a travelling position at the welding condition calculating device 33 can be done as with the above case of one electrode. That is, a welding current and a welding voltage of each of the preceding electrode and the following electrode can be calculated using the equation (2). Furthermore, in the flowchart of FIG. 7, the welding current and the welding voltage of each of the preceding electrode and the following electrode are updated at the step S11 for updating welding current and voltage, and the welding current and the welding voltage of each of the preceding electrode and the following electrode when next one weaving cycle is performed are determined by calculation at the step S13 for calculating welding current and voltage for next one weaving cycle.

In a control system according to the present invention, welding conditions to be changed may include only one of a welding current, a welding voltage and a welding speed. For example, a control system according to the present invention may change one of a welding current, a welding voltage in order to obtain a welding bead of a desired shape. And for example, a control system according to the present invention may change only a welding speed to a high value in the case where a welding bead is made thin by maintaining the welding current constant.

In a control system according to the present invention, welding conditions to be changed may include a welding current and a welding voltage, a welding voltage and a welding speed, or a welding current and a welding voltage. For example, a control system according to the present invention may change a welding current and a welding voltage to high values so that a depth of fusion is made deep.

What is claimed is:

1. An arc welding robot including a control system for controlling the arc welding robot to weld work pieces while performing a weaving operation at a predetermined movement pattern, the control system including a computer comprising:

a memory for storing a welding condition changing start point, a welding condition changing finish point, welding conditions at the welding condition changing start point, and welding conditions at the welding condition changing finish point, the welding conditions at the welding condition changing start point and the welding conditions at the welding condition changing finish point each including a weaving cycle, a weaving amplitude, and at least one of a welding current, a welding voltage and a welding speed;

means for producing a weaving operation command allowing a welding torch of the arc welding robot to perform a weaving operation of a predetermined movement pattern, and also for outputting a signal of completion of one weaving cycle stored in the memory every time when the welding torch completes one weaving cycle of the predetermined movement pattern according to a weaving operation command;

means for calculating a travelling position of the welding torch having travelled from the welding condition changing start point toward the welding condition changing finish point stored in the memory;

means for calculating a correction value corresponding to a distance from the welding condition changing start point stored in the memory to the travelling position calculated by the means for calculating a travelling position of the welding torch, based on a difference between the welding conditions at the welding condition changing start point and the welding conditions at the welding condition changing finish point stored in the memory, and for determining to-be-changed welding conditions at the travelling position by adding the correction value to the welding conditions at the welding condition changing start point; and means for changing welding conditions for the arc welding robot based on the to-be-changed welding conditions at the travelling position every time when the signal of completion of one weaving cycle is input, and responsive to the signal of completion of one weaving cycle.

2. The arc welding robot according to claim 1, further comprising:

means for allowing the means for changing welding conditions to change the welding conditions for the arc welding robot after a delay time has passed, the delay time being defined as a time period from when the signal of completion of one weaving cycle is input to the means for changing welding conditions to when the welding torch completes to perform one weaving cycle of the predetermined movement pattern.

3. The arc welding robot according to claim 1, wherein the arc welding robot comprises a welding torch having a preceding electrode and a following electrode at the end thereof and two welding power sources for the preceding electrode and for the following electrode, wherein the memory stores welding conditions at the welding condition changing start point for the preceding electrode, welding conditions at the welding condition changing start point for the following electrode, welding conditions at the welding condition changing finish point for the preceding electrode, and welding conditions at the welding condition changing finish point for the following electrode, and wherein the means for calculating a correction value determines to-be-changed welding conditions at the travelling position of each of the preceding electrode and the following electrode.

4. A method for controlling an arc welding robot for welding work pieces while performing a weaving operation at a predetermined movement pattern, the method being performed by a computer controlling the arc welding robot and comprising the steps of:

storing, in a memory of the computer, a welding condition changing start point, a welding condition changing finish point, welding conditions at the welding condition changing start point, and welding conditions at the welding condition changing finish point, the welding conditions at the welding condition changing start point and the welding conditions at the welding condition changing finish point each including a weaving cycle, a weaving amplitude, and at least one of a welding current, a welding voltage and a welding speed;

using the computer to produce a weaving operation command allowing a welding torch of the arc welding robot to perform a weaving operation at a predetermined movement pattern, and also for outputting a signal of completion of one weaving cycle every time when the welding torch completes one weaving cycle of the predetermined movement pattern according to a weaving operation command;

using the computer to calculate a travelling position of the welding torch having travelled from the welding condition changing start point toward the welding condition changing finish point;

using the computer to calculate a correction value corresponding to a distance from the welding condition changing start point to the travelling position calculated at the welding condition changing position calculating step, based on a difference between the welding conditions at the welding condition changing start point and the welding conditions at the welding condition changing finish point, and for determining to-be-changed welding conditions at the travelling position by adding the correction value to the welding conditions at the welding condition changing start point;

using the computer to change welding conditions for the arc welding robot based on the to-be-changed welding conditions at the travelling position every time when the signal of completion of one weaving cycle is input, and responsive to the signal of completion of one weaving cycle; and performing welding based on the changed welding conditions.

* * * * *